Patented Nov. 17, 1925.

1,561,909

UNITED STATES PATENT OFFICE.

THOMAS M. CHANCE, OF PHILADELPHIA, PENNSYLVANIA.

METHOD FOR PRODUCING FLUID MEDIUMS OF HIGH DENSITY.

No Drawing.   Application filed December 29, 1924. Serial No. 758,783.

*To all whom it may concern:*

Be it known that I, THOMAS M. CHANCE, a citizen of the United States, residing at Philadelphia, in the county of Philadelphia and State of Pennsylvania, have invented certain new and useful Methods for Producing Fluid Mediums of High Density, whereof the following is a specification.

My invention relates to the production and maintenance of fluid separating mediums such as I have described as fluid masses in U. S. Patent No. 1,224,138, issued May 1, 1917, for method and apparatus for separating materials of different specific gravities by means of a fluid mass of intermediate specific gravity, said fluid mass consisting of an agitated mixture of liquid and appreciably coarse comminuted solid matter heavier than said liquid and substantially insoluble therein.

In carrying out such separations, as for example, the separation of coal from slate and other heavy impurities in which the fluid mass used may consist of an agitated mixture of sand and water and in which agitation is effected in part or in whole by water admitted under pressure below the body of said separating fluid mass, the fluidity of said fluid mass and its agitation is effected in whole or in part by said water, which rising upwardly keeps the grains of sand sufficiently separated to insure the maintenance of the desired specific gravity and proper fluidity of the mixture, so that the upwardly rising water, if constant in quantity, maintains an approximately fixed relation between the volume of sand, its voids and the water filling said voids.

The specific gravity of any fluid mass of this type, whether the liquid used be water or other liquid, and the comminuted solid be sand, natural or artificial, composed of grains of quartz or any other mineral or substance, depends upon the ratio of solids to liquid, the percentage of liquid being equal to the voids between the grains of sand or other material used, the specific gravity increasing as said voids decrease. The specific gravity can therefore be calculated for any relation of sand to voids, thus with quartz sand, specific gravity 2.65, 40 per cent, and voids 60 per cent, 40 per cent sand, sp. gr. 2.65_____ 1.0600
60 per cent water, sp. gr. 1.00_____ .6000 specific gravity of fluid mass_____ 1.6600

As the specific gravity is increased by diminishing the percentage of water a limit is reached by reason of the close approach of the grains of sand, the fluid mass becoming "thick" or viscid and losing the fluidic properties essential to rapid sinking of the heavier of the materials to be separated.

In the separation of materials by fluid masses composed of any certain comminuted solid, it often may be advantageous to increase the specific gravity of the fluid mass without decreasing its fluidic properties, or to maintain its specific gravity and increase its fluidity.

I accomplish this end by providing a fluid mass consisting of a liquid and grains of the comminuted solid used, and preferably with a liberal percentage of voids, and by providing a secondary fluid mass consisting of a mixture of said liquid and materially smaller grains of comminuted solid matter, said secondary fluid mass having a sufficient percentage of liquid to insure the desired fluidity. This secondary fluid mass is formed, or its constituents are introduced under pressure, below the upper portion of the separating fluid mass and continuously rises through the voids between the relative coarser grains of the separating fluid mass, thus maintaining the agitation and fluidity of the separating fluid mass and increasing its specific gravity by the weight of the smaller grains of comminuted solid matter carried by the secondary fluid mass.

The comminuted solid used for the production of the secondary fluid mass may consist of relatively small grains of the same solid used for the production of the separating fluid mass or may consist of grains of any other suitable substantce.

If in the above example, the secondary fluid mass consists of relatively fine grains of quartz, specific gravity 2.65 and is composed of

| | |
|---|---|
| 20 percent fine sand, sp. gr. 2.65 | .5300 |
| 80 percent water, sp. gr. 1.00 | .8000 |
| specific gravity of secondary fluid mass | 1.3300 |

If this fluid mass be used as the liquid for agitating a fluid mass as in the first above example, the specific gravity resulting will be;

| | |
|---|---|
| 40 percent sand, sp. gr. 2.65 | 1.0600 |
| 60 percent secondary fluid mass, sp. gr. 1.33 | .7980 |
| specific gravity of separating fluid mass | 1.8580 |

If in the above example the secondary fluid mass be composed of a heavier material such, for example, as magnetic iron ore, specific gravity, 5.00, the resulting specific gravity may be calculated thus;

| | |
|---|---|
| 10 percent magnetite, sp. gr. 5.00 | .5000 |
| 90 percent water, sp. gr. 1.00 | .9000 |
| specific gravity of secondary fluid mass | 1.4000 | and if this be used as the liquid for agitating a quartz sand fluid mass as in the above example, the specific gravity will be;

| | |
|---|---|
| 40 percent sand, sp. gr. 2.65 | 1.0600 |
| 60 percent of secondary fluid mass sp. gr. 1.40 | .8400 |
| specific gravity of separating fluid mass | 1.9000 |

In carrying out my invention the grains of solid matter of the secondary fluid mass should be of such size, weight or shape as to have a materially slower falling velocity in the liquid used than the grains of solid matter provided for the formation of the primary separating fluid mass, in order that they may be carried up through the separating fluid mass and assist in the agitation thereof. The upward velocity of the secondary fluid mass, as a whole, should be sufficient to maintain it at the required specific gravity, and also to insure the maintenance of the desired percentage of voids in the separating fluid mass. The upward velocity of the liquid of the secondary fluid mass must be materially greater than the falling velocity of the grains of solid matter of said secondary fluid mass in said liquid.

From the foregoing description it will be apparent that the secondary fluid mass rising through the separating fluid mass will accumulate and form a body of fluid mass superposed upon the separating fluid mass unless provision be made for its removal. In carrying out my invention I therefore continuously remove said secondary fluid mass from the upper part of the apparatus in which separation is effected and reintroduce the constituents thereof below the said separating fluid mass, the secondary fluid mass therefore being operated as a practically continuous or closed circuit, provision being made for reconditioning and supplying components lost in the operation of the process.

In carrying out my invention it may often be possible to use a natural or artificial sand the grains of which vary widely in size. When a fluid mass is formed with such materials and agitation is effected mainly or wholly by upwardly rising liquid, the sand grains will soon become sorted by the classifying action of the upwardly rising liquid, the smaller and lighter grains accumulating at the top and forming a fluid mass of generally lower specific gravity superposed upon a fluid mass of coarser grains and usually of higher specific gravity. Under such conditions my invention may be carried out by removing this superposed lighter fluid mass and introducing it or its solid constituent under pressure below the upper part of the said portion of the fluid mass that is of the higher specific gravity, thus increasing the specific gravity of that portion of the fluid mass that is to be used as a fluid medium of relatively high density for the separation of materials of different specific gravities by the flotation of the lighter and the sinking of the heavier of said materials.

From the foregoing it will be apparent that the increase in specific gravity obtained by the described method is due to a reduction of the voids by the addition of particles small enough to occupy the voids without actual contact between the larger and smaller particles. The total solids may thus be increased by proper grading of the sizes of the individual particles of solid matter, in a manner quite similar in principle to the grading of sand, gravel, crushed stone, etc. in the preparation of mixes for making concrete with a maximum percentage of coarse and fine aggregate and a minimum percentage of cement.

The application of my invention to the production of fluid separating mediums by the use of solids other than sand and of liquids other than water will readily be understood by those familiar with the art.

Having described my invention, I claim,

1. A method for producing and maintaining fluid mediums of relatively high density, which consists in agitating a mixture of liquid and comminuted solid matter heavier than said liquid and substantially insoluble therein by a supply of said liquid introduced under pressure in the region at the lower part of said mixture, whereby a fluid medium of relatively high density is produced and maintained and whereby the smaller and lighter particles of said comminuted solid are continuously carried up through said fluid medium to form an upper division of said agitated mixture, in removing said smaller and lighter particles from said upper division and in introducing said smaller and lighter particles into said fluid medium at a region materially lower than the top of said fluid medium.

2. A method for producing fluid mediums of relatively high density, which consists in mixing a liquid with comminuted solid matter the individual particles of which are divisible into a plurality of groups of particles of different sizes, the quantity of particles forming any group being sufficient to materially reduce the voids in the next coarser group of particles, said comminuted solid matter being heavier than said liquid and substantially insoluble therein, in agitating said mixture to produce and maintain the fluidity of said mixture and in transporting the smaller of said particles accumulating in the upper portion of said fluid medium to a region in said fluid medium materially lower than the top of said upper portion.

3. A method for producing and maintaining fluid mediums of relatively high density, which consists in agitating a mixture of liquid and comminuted solid matter heavier than said liquid and substantially insoluble therein by a supply of said liquid introduced under pressure in the region at the lower part of said mixture, said comminuted solid matter being so graded as to the relative sizes of its individual particles as to reduce the interstices between said particles and thus reduce the ratio of voids to solids in said comminuted solid matter, in removing from the upper part of said agitated mixture the smaller particles of said solid matter that accumulate therein and in returning said smaller particles to said agitated mixture at a region materially lower than that from which said smaller particles are removed from said agitated mixture.

Signed at Philadelphia, Pennsylvania, this 29th day of December 1924.

THOMAS M. CHANCE.